INVENTOR
CHARLES W. CLARK

BY Watson, Cole, Grindle & Watson
ATTORNEYS

SOUND RECORD PRODUCING APPARATUS

Filed June 4, 1964

INVENTOR
CHARLES W. CLARK
BY Watson, Cole, Grindle & Watson
ATTORNEYS

March 28, 1967 C. W. CLARK 3,311,378

SOUND RECORD PRODUCING APPARATUS

Filed June 4, 1964 6 Sheets-Sheet 3

INVENTOR
CHARLES W. CLARK

BY Watson, Cole, Grindle & Watson
ATTORNEYS

March 28, 1967 C. W. CLARK 3,311,378

SOUND RECORD PRODUCING APPARATUS

Filed June 4, 1964 6 Sheets-Sheet 4

INVENTOR
CHARLES W. CLARK

BY Watson, Cole, Grindle & Watson
ATTORNEYS

INVENTOR

CHARLES W. CLARK

BY Watson, Cole, Grindle & Watson

ATTORNEYS

INVENTOR
CHARLES W. CLARK

BY Watson, Cole, Grindle & Watson
ATTORNEYS

United States Patent Office 3,311,378

Patented Mar. 28, 1967

3,311,378

SOUND RECORD PRODUCING APPARATUS

Charles William Clark, 24 Manchester Square, London W.1, England

Filed June 4, 1964, Ser. No. 372,570
4 Claims. (Cl. 274—10)

Figure 1:
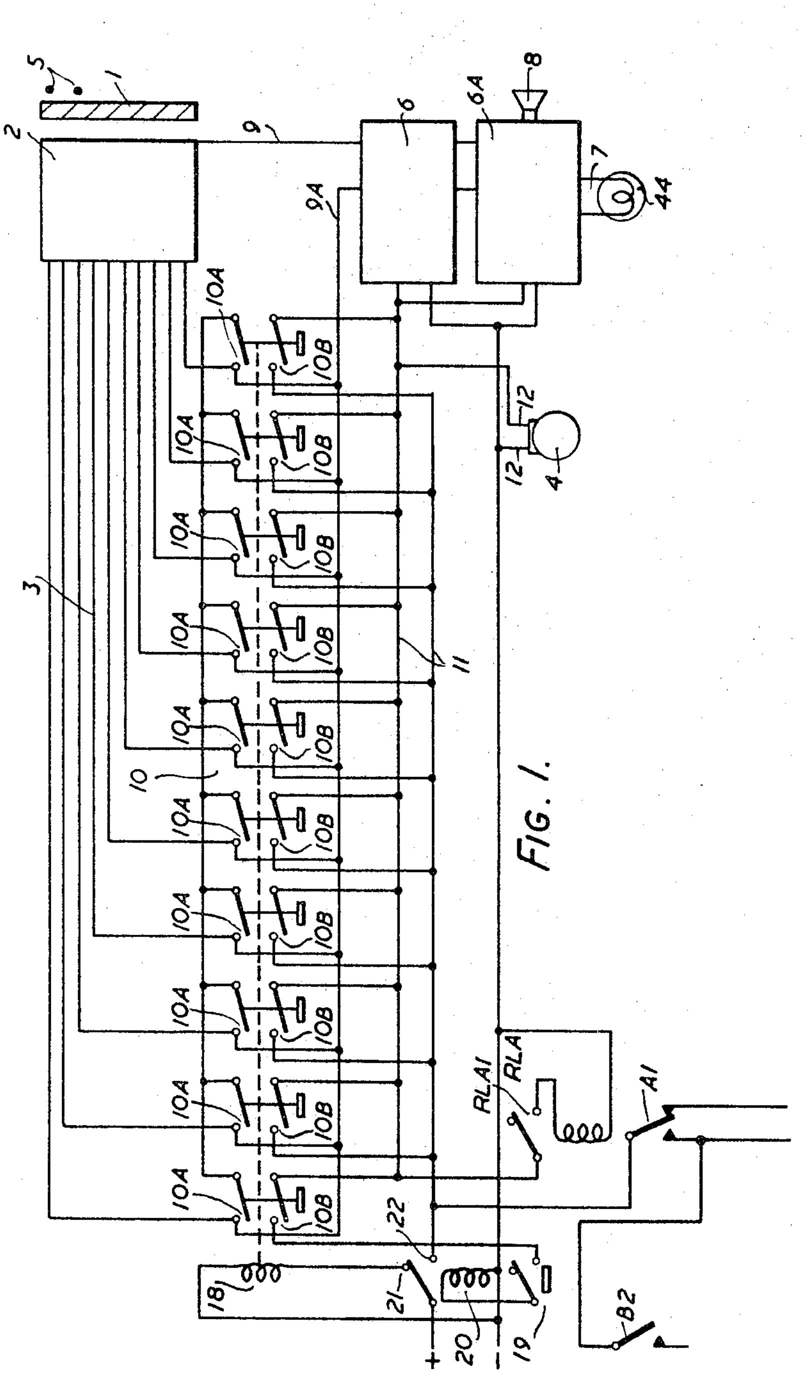

This invention relates to sound record producing apparatus and has for its object to provide a form of apparatus which will enable a sound record bearing a recording of any one of a selected number of "works" to be supplied when required, the word "works" being used herein for convenience to mean any recorded musical or other item but with more particular reference to musical item of immediate popularity such as a vocal item of the kind included in what is popularly termed the "Top Ten," meaning the ten recorded popular musical items for which, at the moment, there is the greatest popular demand.

Sound record producing apparatus according to the invention comprises means for supporting in a readily removable and replacable manner and traversing a series of sound tracks constituting sound records, pick-up means for transmitting to amplifying apparatus electrical impulses derived from said sound tracks during traversing, means for selectively rendering the sound tracks and pick-up means effective to transmit impulses to the amplifying apparatus from any selected sound track during its traverse of its associated pick-up means, a rotary support or turn-table for a record disc on which a mechanical sound record can be made, a stylus type recording head connected to the amplifying apparatus and having associated with its recording head control means arranged to bring the stylus into and out of recording engagement with a record disc disposed upon the turn-table to make a sound record thereon in the form of a spiral groove, storage means for a plurality of record discs, transfer means for transferring the discs one by one from the storage means to the turn-table and for removing each disc from the turn-table prior to the transfer of the next disc on to the turn-table and delivering the removed disc to a receiving point, and operating mechanism arranged to be brought into operation by an initiating device operable or releasable by a coin or token and arranged so that upon such initiation it renders the amplifying apparatus effective, it causes traversing of the pick-up means by the appropriate sound track and causes operation of the turn-table and recording head control means to cause the stylus to record on a record on the turn-table the signals derived from the amplifying apparatus, and subsequently causes removal of the disc from the turn-table and delivery of the disc to the receiving point.

Preferably the plurality of sound tracks are provided on a multi-track recording tape or a series of recording tapes the pick-up means comprises a multi-channel recording head or a plurality of recording heads associated with the respective sound tracks while the means for selectively rendering the sound tracks and pick-up means effective comprise manually operable selector switch means by which the pick-up means associated with any one of the sound tracks can be selected and connected to the amplifying apparatus. In the case of a multi-track recording tape and a multi-channel pick-up means therefor, single traversing means for the multi-track tape can be provided while in the case where the various sound tracks are recorded on two or more tapes each having associated with it an individual pick-up means for traversing means for all the tapes may be put into operation at the appropriate time but the signals from one sound track only will be delivered to the amplifying apparatus.

The tape or each tape will in any event preferably be in the form of an endless strip arranged upon an annular carrier in known manner with a loop for engagement with the pick-up means and traversing means while the remainder of the tape is arranged in a spiral capable of travelling around the carrier. Thus in this case means will be provided for stopping the traverse of tape or each tape at a neutral point in its length between the end of the sound track or sound tracks thereon and the beginning of such sound track or sound tracks. Such means may be of known type for example in the form of a metallic strip applied to the appropriate part of the tape and co-operating with a micro-switch, as in conventional types of tape recording apparatus.

The construction and arrangement of the turn-table, the recording head and the mechanism by which the required movements of the head are controlled and effected may follow closely the corresponding mechanism in the apparatus described in the specification of the present applicant's British Patent No. 924,694 except that no pick-up head and stylus would be provided and the recording head would be returned to its initial position automatically at the end of a recording operation instead of continuing to travel with the pick-up head during a subsequent re-playing operation.

Figure 2:
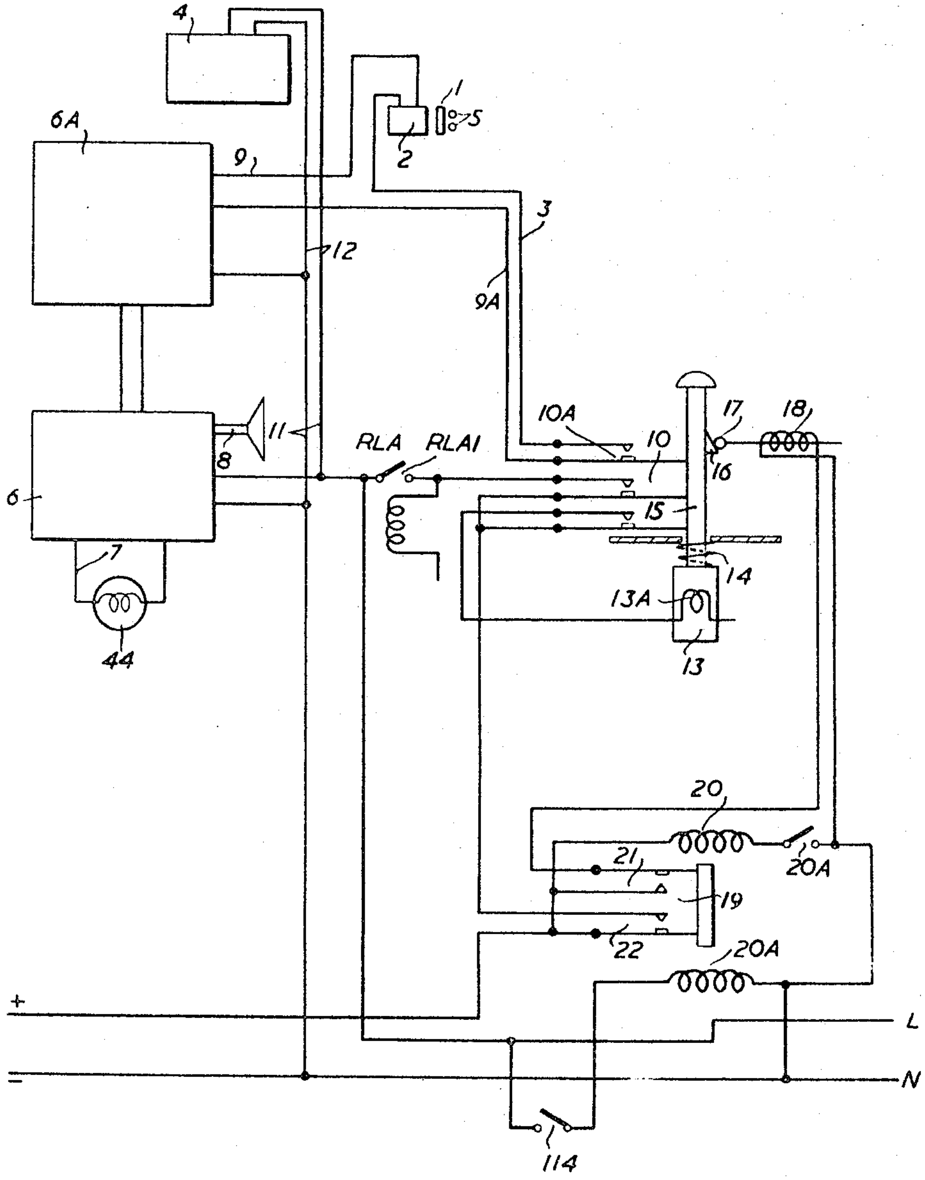
Figure 3:
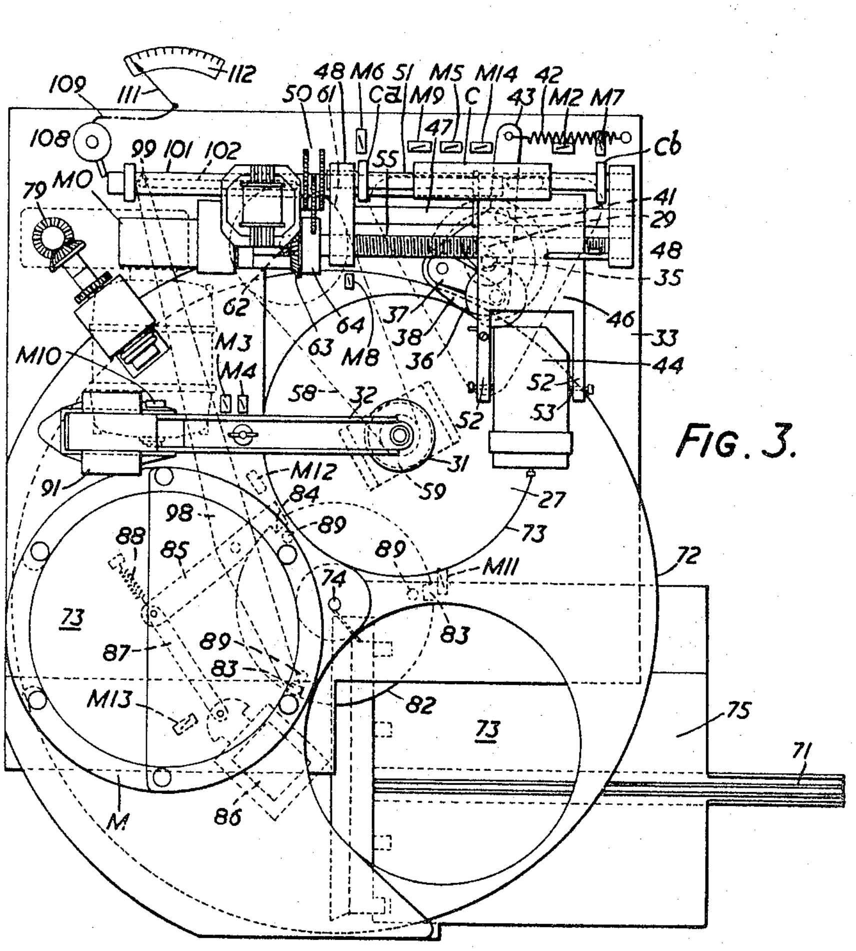
Figure 4:
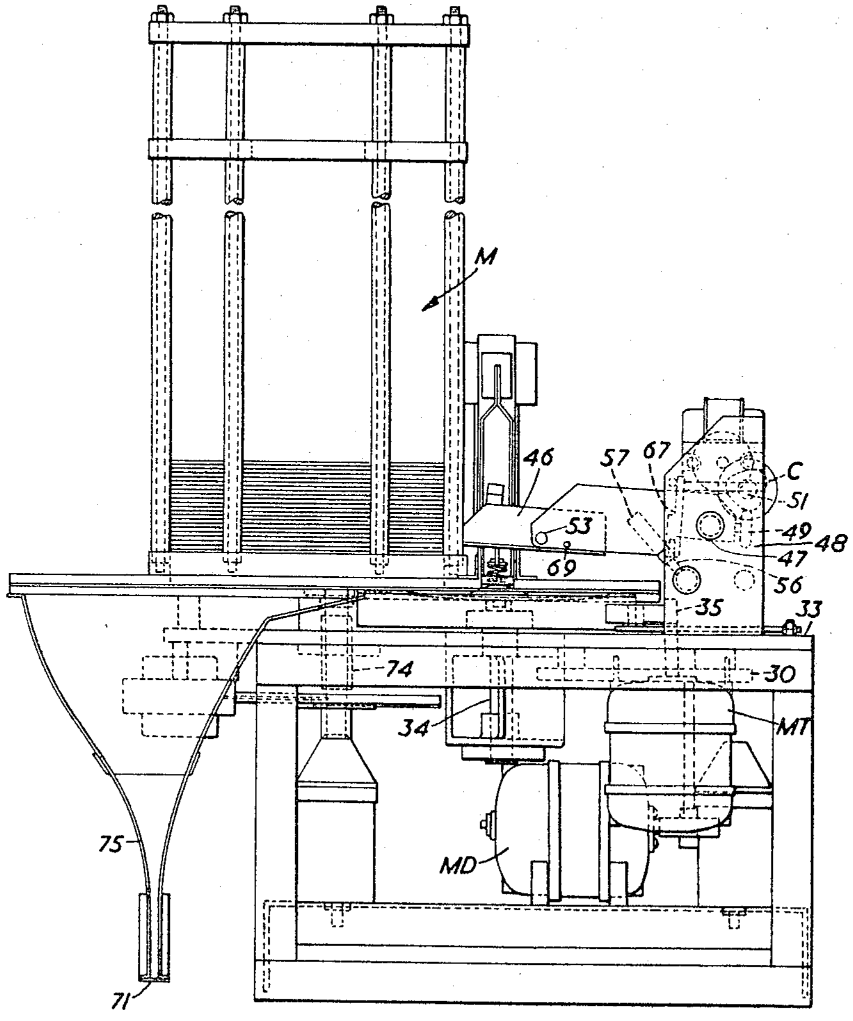
Figure 5:
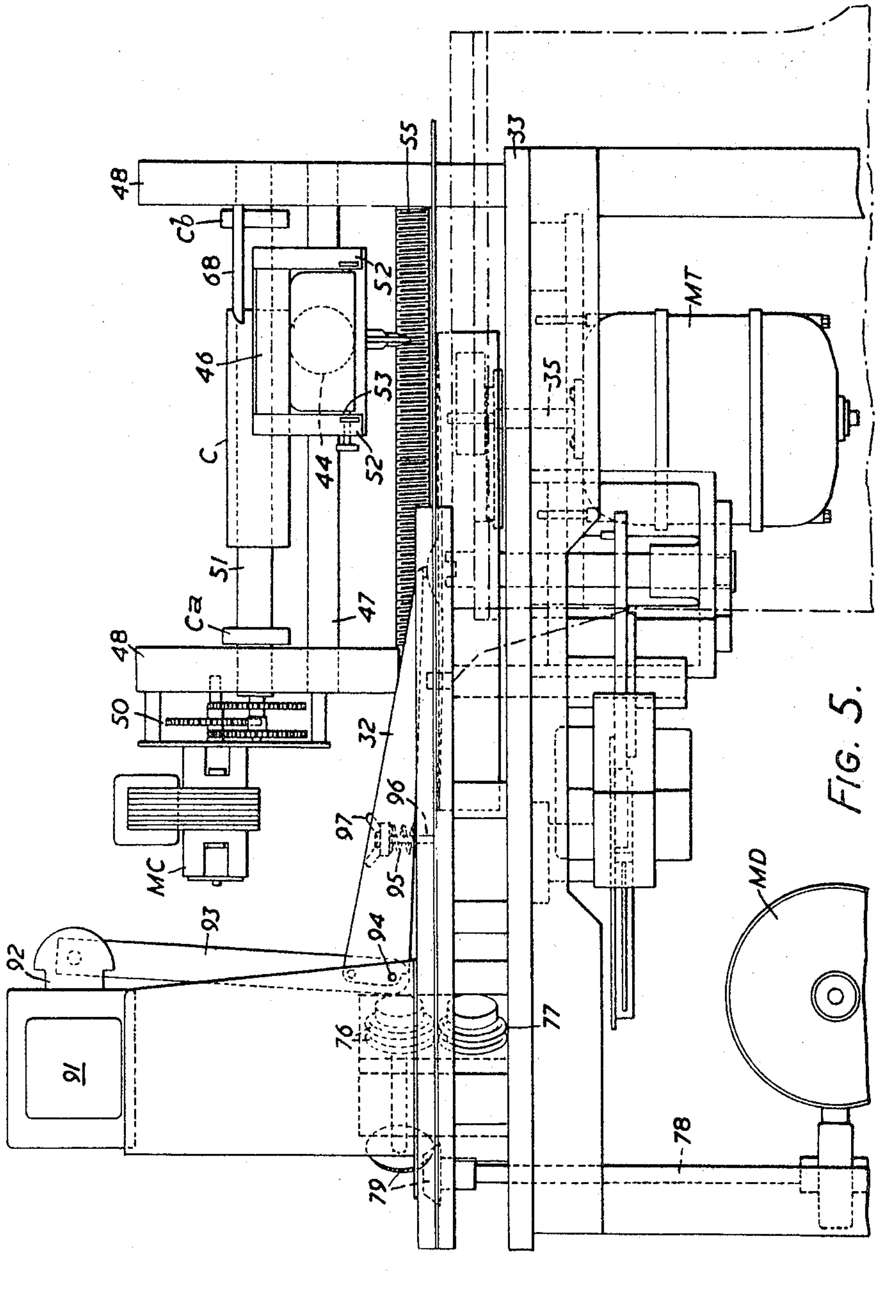
Figure 7:
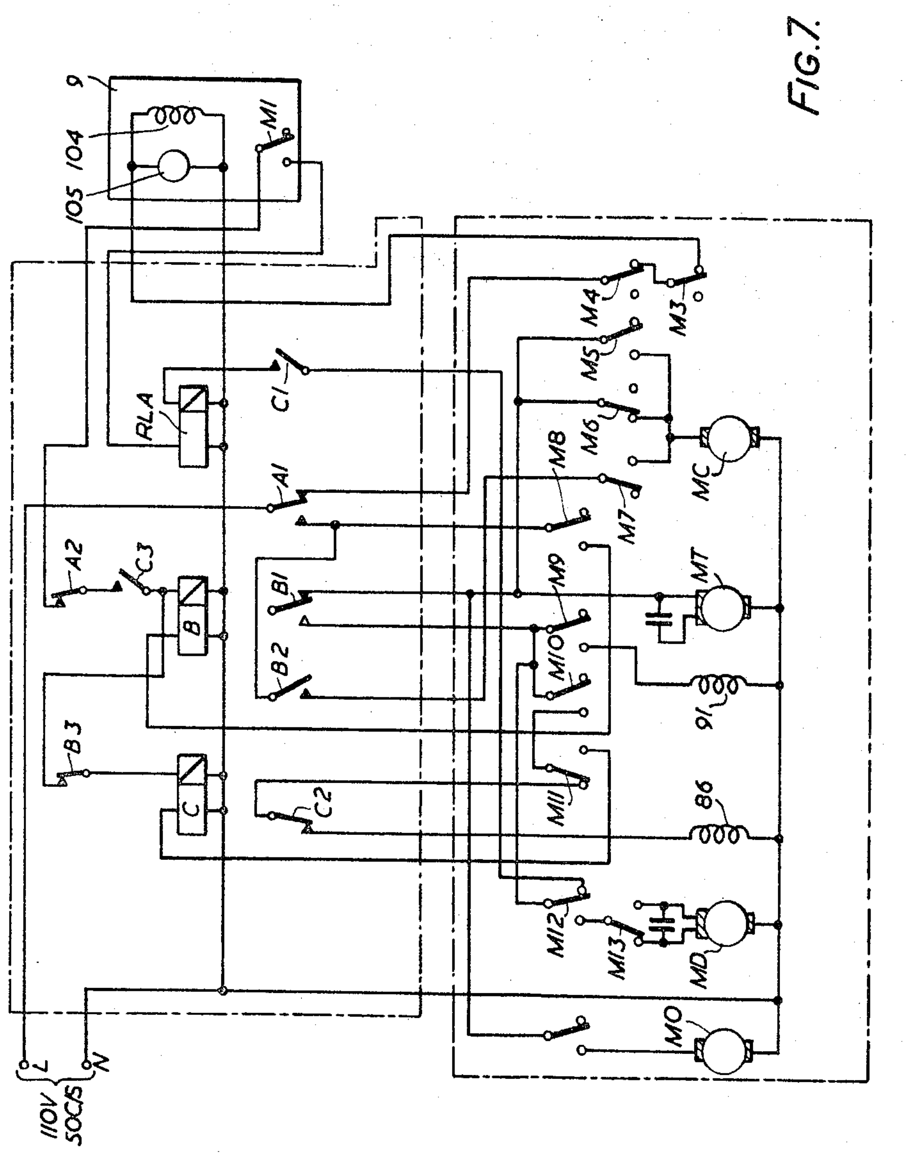

One arrangement according to the invention incorporating apparatus of the above kind for forming the actual mechanical sound record in the form of a groove on a record disc is shown, largely diagrammatically, in the accompanying drawings in which:

FIGURE 1 is a diagram showing the general arrangement of the electrical interconnections between the various parts of the apparatus by which the "work" to be recorded on a disc type record is selected and transmitted but omitting various details, FIGURE 2 is a somewhat diagrammatic view of one of the selector switches incorporated in FIGURE 1 with its connections to a coin operated switch and the amplify-apparatus, the tape traversing motor and its ten channel of the pick-up head, FIGURES 3, 4 and 5 respectively show in plan, front elevation and side elevation the part of the apparatus which forms a sound track on a disc type record during operation of the apparatus.

Figure 6:
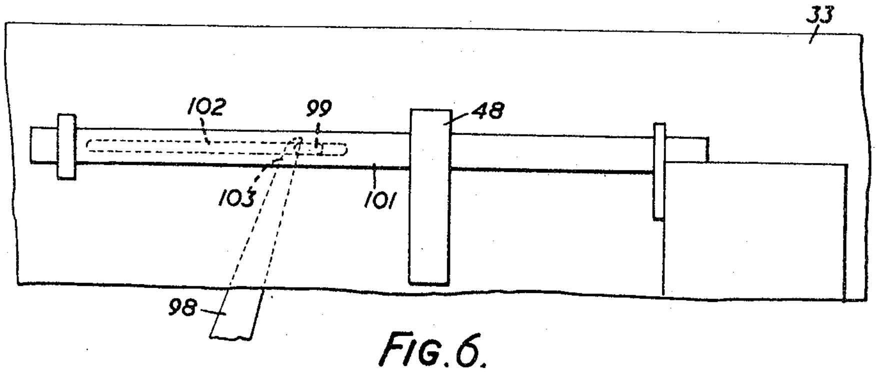

FIGURE 6 shows a detail of the carriage return mechanism included in the apparatus shown in FIGURES 3, 4 and 5, and FIGURE 7 is a diagram of the electric circuits and associated parts of the apparatus, shown in FIGURES 3 to 6.

The apparatus diagrammatically shown in FIGURE 1 may be assumed to be contained within an appropriate booth having a compartment for the person (hereinafter called the operator) who desires to have a record made, and a compartment in which is contained the record making apparatus, apart from such items as are provided for operation by the operator.

The apparatus comprises support and traversing apparatus of known type for a multi-track endless tape which will be assumed to have ten tracks on which are recorded respectively ten popular works, the tracks beginning and ending as nearly as is practicable at the same point in the lengths of the tape, with a gap between the ends of the tracks, in which gap in the normal position of rest of the apparatus lies a multi-channel pick-up head, the various channels of which will during traversing of the tape be traversed by the various tracks. In FIGURES 1 and 2 the multi-track tape is shown diagrammatically at 1 in close association with a multi-channel pick-up head 2 the connections to the various channels of which are shown generally at 3.

The tape is arranged to be traversed in known manner by an electric motor indicated at 4 and there is associated with the tape a tape-operated switch indicated at 5 which is closed for example by a metal strip on the tape situated in the gap between the end of the sound tracks. Pre-amplifying and amplifying apparatus is provided as indicated at 6 and 6A the main output from the amplifying apparatus 6A being indicated at 7 while an output from an intermediate amplification stage is connected to a loud speaker as indicated at 8. One side 9 of the signal input to the pre-amplifying apparatus 6 is connected to a terminal on the ten channel pick-up head 2 which is connected to one side of each of the individual pick-up elements in the head while the other sides of these pick-up elements are connected each to a different one of the connections 3. The connections 3 are connected to selector switch apparatus by which any one of the pick-up elements can be rendered effective. This selector switch apparatus comprises a gang of manually operable push button switches generally indicated at 10 and each of the form hereinafter more fully described. Each of the switches 10 is arranged to operate two pairs of contacts one of which, the contacts 10A, connect the associated connector 3 to the second signal input line 9A for the pre-amplifier while the other pair of contacts 10B close the power input circuit 11 of the amplifier and pre-amplifier, the circuit 12 of the tape traversing motor 4 and the operating circuit of a relay RLA which has in addition to its holding contacts RLA, two sets of contacts A1 and A2 forming part of the circuitry shown in FIGURE 7 and corresponding to the relay A of the apparatus described in the specification of the present applicant's British Patent No. 924,694. Operation of the Relay RLA thus serves to bring into operation record making apparatus as described hereafter which is generally similar to that described in that specification except that, instead of the recording head being connected to the output of an amplifier arranged to receive signals from a microphone, the recording head is connected to the output line 7 of the amplifier 6A, while the pick-up head associated with the recording head in the apparatus described in the referenced patent is omitted and certain consequential alterations made.

Each of the switches 10 is constructed and arranged as somewhat diagrammatically shown in FIGURE 2 and comprises a push-button 13 capable of being pressed inwards against the action of a spring 14 and having a rod 15 on which is provided a catch member 16 cooperating with a solenoid-controlled holding member 17 which when the solenoid 18 associated therewith is de-energized serves to hold the push button, after being pressed in, in its pressed in position (hereinafter called the operative position).

The power supply to the push button switches 10 is controlled by a coin operated switch 19 arranged in known manner to energise a relay 20 when a coin is inserted in a slot, the relay 20 having a pair of normally closed contacts 21 which maintain the solenoid 18 energised and a pair of normally open contacts 22 which are closed when the relay is energised by insertion of a coin in the slot and serve to connect the appropriate side of the press button switches 10 to the main source of power.

It will thus be seen that before any coin has been inserted in the slot not only is there no power supply to the press button switches 10 so that none of the power operated devices incorporated in the apparatus can be brought into operation but if a press button switch 10 is depressed it will not stay in its depressed position but will return, on release, to its normal position.

The gang of press button switches 10 is arranged to form self locking selector switch apparatus of known type in which it is not only impossible to depress two of the press buttons simultaneously but when one press button has been depressed no other press button in the gang can be depressed until the depressed button has been released. It is not therefore possible for an operator to bring two record tracks into effective operation at the same time or to change from one record track to another during a record making operation.

Thus, upon insertion of a coin, the following sequence occurs. The switch 19 is closed and the relay 20 thus energised and is held by its contacts 20A. This opens the contacts 21 to render the device 17 operative but closes the contacts 22 thus providing power supply to the selector switches 10 and to the apparatus shown in FIGURE 7 via the conductors indicated at L and N.

The operator then presses the selected push-button 13 and this closes the power circuits of the amplifier and pre-amplifier 6A and 6 and of the tape driving motor 4 and at the same time connects the selected channel of the pick-up head 2 to the signal input of the pre-amplifier 6A in addition it illuminates an indicator lamp 13A.

The tape thus traverses the pick-up head 2 and impulses from the selected track of the multi-track tape 1 are transmitted to the signal input connections 9, 9A of the pre-amplifier whereby amplified corresponding output signals are transmitted from the amplifier output 7 to the recording head of the apparatus for making a record of the selected work on a disc type record as hereinafter more fully described.

When the recording head of that apparatus reaches the end of its travel, by which time a recording on a disc will have been produced by the apparatus shown in FIGURES 3 to 7, the closing of a micro switch in the apparatus as hereinafter described causes closing of the relay circuit of the relay 20 so that the contacts 22 open and the contacts 21 close. This closes the circuits of the solenoids 18 to cause release of the selected push-button 13 whereupon the apparatus is again in the initial state.

In the meantime the apparatus shown in FIGURES 3 to 7 has caused a disc type recording of the selected work to be made, and delivers the disc to a receiving point as hereinafter described.

The apparatus shown in FIGURES 3 to 7 for recording on a disc type record a work transmitted from the apparatus shown in FIGURES 1 and 2 includes a power driven turntable 27 arranged for rotation about a vertical axis by an electric motor MT. Energisation of the motor is controlled by automatic control means which is set in operation by the closing of contacts A1 and A2 as above described. Upon the turntable 27 is shown a blank record disc previously positioned thereon after delivery from a pile of blank discs on a storage magazine M by a delivery mechanism described below. The disc is clamped upon the table by a freely rotatable clamping head 31 pressed against the centre of the record disc by a clamp arm 32 to thrust the record disc firmly against the upper surface of the turntable. In order to help secure the disc in position, the upper surface of the turntable is of rubber and is slightly dished so that the pressure of the clamping head causes the record disc to be depressed somewhat at its centre.

The turntable 27, which is supported above a horizontal platform 33 upon a vertical spindle, is driven from the drive output shaft 35 of the motor MT (which is mounted upon a plate 30 secured to the under side of the platform) by a rubber shod driving wheel 36 rotatably mounted about a vertical axis at one end of a trailing horizontal arm 37.

The arm 37 is pivotally carried at its other end by a horizontal plate 38 which lies between it and the platform. The driving wheel 36 is in frictional contact both with the periphery of the turntable 27 and with a circumferential portion of the driving shaft 35 which projects upwards from the motor MT through the platform 33 and through an arcuate slot 29 in the plate 38. The slot is curved about a vertical axis 41 around which the plate is mounted to pivot and this axis 41 and the axes of rotation of the turntable and driving shaft of the motor MT are arranged in a common vertical plane, the axis 41 being located between the other two. The arm 37 is arranged to extend substantially at right angles to the said plane with the driving wheel so positioned that when transmitting drive between the driving shaft and the turntable, its rotation tends to move it into close contact with the said turntable and shaft. A spring 42 is secured between the platform and an extending arm 43 of the plate to ensure that during periods when the motor MT is stopped, the driving wheel remains in contact with the turntable and the drive shaft.

A recording head 44 is mounted upon a carriage 46 which is arranged for lateral movement such as to cause its groove-forming stylus to move along a radial path towards the axis of rotation of the turntable. The carriage 46 is mounted for sliding along the length of a horizontal guide rod 47 arranged parallel with the said radial path and supported at each end by support blocks 48 mounted upon the upper surface of the platform 33. The carriage 46 is also arranged for pivotal movement about the guide rod 47 under the control of a cam C which is rotatable to bring the carriage into one or other of two positions namely, a position in which the carriage is held in a lifted position with the stylus of the recording head held clear of the record disc, and a lowered position with the stylus of the recording head engaging the surface of the record disc. A roller 49 at the rear of the carriage, that is to say, at the end of the carriage which is remote from the turntable, acts as a bearing between the carriage and the cam surface.

The cam C comprises a solid cylindrical body coaxially mounted and centrally positioned upon a cam support rod 51 parallel with the guide rod 47 and rotatably mounted at each end in bearings in the support blocks 48. The cam is of such length that during the whole of the lateral movement of the carriage along the guide rod any rotation of the cam (which is rotated by an electric motor MC coupled to drive it through reduction gearing 50 as described more fully hereinafter) causes the carriage to pivot about the guide rod to raise or lower the forward end of the carriage. The front of the carriage carries two integral forwardly extending parallel arms 52 supporting a horizontal rod 53 upon which the recording head 44 is adjustably mounted. The recording head is, of course, so positioned upon the carriage that when the carriage is lowered the recording head stylus engages the surface of a disc upon the turntable to form a sound groove therein.

Drive is transmitted to the carriage 46 to move it along the length of the guide rod 47 by mechanism including a lead screw 55 which lies parallel with the guide rod. The lead screw is rotatably supported at each end in the support blocks 48 and is engaged by a follower 56 carried in a mounting 57 secured to an under part of the carriage. The follower extends from beneath the carriage towards the rear thereof at an angle of approximately 45° to the length of the carriage and is resiliently urged outwardly of the mounting so as to engage the lead screw 55 and so impart movement to the carriage along the guide rod. When however the cam C lifts the carriage to its raised position, the connection between the lead screw and follower is broken.

Power to drive the lead screw is transmitted thereto by a belt drive 58 which is located below the platform and coupled between a pulley wheel 59 secured to the turntable spindle to rotate with it and a pulley wheel 61 carried upon a vertical shaft mounted in a bearing in the platform. The upper end of the vertical shaft carries a bevel pinion 62 which engages a bevel wheel 63 coupled to an end of the lead screw through a unidirectional driving device comprising a free-wheel mechanism 64.

The portion of the free-wheel device next adjacent the lead screw is also coupled to be driven by the output shaft of an auxiliary "over-drive" motor MO, the arrangement being such that on energisation of the motor during the sequence of operation of the apparatus (as explained hereinafter) the lead screw is rotated by the motor MO at a rate higher than that at which it is rotated through the belt drive 58. The recording head stylus, which at the time of energisation of the motor MO is in contact with the disc surface, is thus caused to form a "run-out" groove in the disc.

The carriage is stopped when the desired position has been reached by the opening of one or other of two switches M6, M7 operated by respective plate cams *Ca* and *Cb* on opposite ends of the cam support rod.

The cam *Ca* is engaged by the follower of the switch M6 which switch is located behind the carriage adjacent the cam *Ca* so that the switch is held open when the follower is engaged by a nose of the cam but is closed at other times. The cam *Cb* is formed with a notch into which falls the follower of the switch M7 when 360° rotation of the cam has occurred to bring the carriage back to the lifted position from which it was lowered at the beginning of the cycle of operation of the apparatus. The switch M7, which is held closed at all other times, falls open when the follower drops into the notch.

As the carriage approaches the end of its travel along the guide rod 27, its movement closes a micro-switch M8 to cause the cam C to be rotated once more to pivot the carriage back into its lifted position. When the carriage attains the lifted position it closes a micro-switch M9 and the apparatus is thereby actuated to release the record from the turntable and deliver it to a delivery point from which the record can be removed by a person in the personal compartment of the booth. During delivery of the record to the delivery point a blank record disc from the magazine M is placed upon the turntable 27, the carriage is returned to its outer position on the guide rod 47 and the apparatus brought back into its original condition in readiness for the initiation of a new record making cycle.

The removal of the record from the turntable and its replacement by a blank record disc is effected by transfer means (referred to herein as delivery mechanism) including a large-diameter, circular, horizontal delivery plate 72 having three circular apertures 73 cut in it of slightly larger diameter than that of the record discs. The apertures 73 are equi-angularly spaced about the centre of the plate 72 on a common pitch circle. The delivery plate is arranged for rotation in steps of 120° about a vertical shaft 74 which is so positioned that during rotation of the plate each aperture is brought, in turn, directly below the pile of blank record discs in the magazine M to have the lowest disc in the pile drop it into it, then brought into a position coaxial with and directly above the turntable 27 to permit the disc within it to rest upon the turntable, and then brought into a position in which it overlies a chute 75 into which the record disc falls for delivery to the slot 71. The next 120° rotation of the plate 72 of course effects a similar transfer operation following the making of the next record.

Rotation of the delivery plate is effected by two rubber-shod, horizontal rollers 76, 77 arranged with their axes one above the other and radial of the delivery plate. The rollers engage the periphery of the delivery plate between them and are driven by a delivery plate motor MD located below the platform. The drive is transmitted from the motor MD to the rollers 76, 77 through shafting 78 and bevel gears 79.

To ensure that when not rotating the delivery plate is accurately located in each of its three angular positions, a circular plate 82 carried upon the delivery plate support shaft 74 below the platform 33 has three notches 83 formed in its periphery at 120° spacing. Each notch is engaged in turn by a spring loaded detent 84 carried at one end of a detent arm 85 pivotable about a vertical axis by a detent actuating solenoid 86 through a link 87. Thus for the delivery plate to rotate from one position to another, the detent is first disengaged from the notch in which it is located by actuation of the solenoid against a spring 88.

Secured upon the upper surface of the notched disc are three upstanding pins 89 each located beside a respective notch 83 for the purpose of actuating a micro-switch M11 supported on a fixed mounting adjacent the plate.

For rotation of the delivery plate the clamp arm 32 must, of course, be released from the record disc upon the turntable and this is effected by actuation of a clamp arm release solenoid 91 whose armature 92 is pivotally secured to the upper end of an upstanding post 93 rigidly fixed to the rear of the clamp arm, the clamp arm being pivotable about a horizontal bearing 94 adjacent the base of the post. Actuation of the solenoid causes movement of the armature to swing the clamp rod round the bearing to lift the clamping head 31 away from the recording disc and so release it.

When the solenoid 91 is de-energised, the clamping head 31 is brought into position upon the new disc by a downwardly acting spring 95 which bears against the upper surface of the clamp arm. The spring is concentrically arranged about a post 96 which is secured to the platform and passes through an aperture formed in the arm, and the compression of the spring can be varied by movement of the position of an adjustable nut 97 threaded upon its upper end. Micro-switches M3 and M4 incorporated in the control means and actuated by movement of the spring clamp arm act as explained hereinafter to prevent operation of the apparatus if no disc lies upon the turntable or if the disc is not properly positioned thereon. Micro-switches M5 and M9 incorporated in the control means are actuable by movement of control surfaces upon the rear of the carriage, as is also a micro-switch M12 actuated on movement of the detent 89.

Return of the carriage to its initial outer position on the guide rod 47, ready once more for lateral movement on re-initiation of the cycle of operation, is effected by a horizontal carriage return lever 98 which is actuated by movement of an appropriate one of the pins 89 carried by the notched disc 82. The lever 98 engages a post 99 on the far end of a thrust rod 101 carried by and laterally extending from the carriage (as shown in FIGURE 6) to push the rod, and therefore the carriage, back to its original position. The post 99 projects downwards through a slot 102 in the platform 33 and is engaged by the tip 103 of the lever 98.

The control means of the apparatus shown in FIGURES 3 to 7 includes electric circuitry which, in addition to the motor and switches referred to above, includes the relay RLA and in addition relays B and C. A cycle of operation of this control means and its associated circuitry will now be described with reference to the circuit diagram of the control means shown in FIGURE 7. Relay RLA is a two-contact relay including the contact A1 previously referred to and an additional contact A2 while relays B and C, have three contacts each.

During recording the pre-amplifier 6 and amplifier 6A amplify signals derived from the selected track of the tape 1 and deliver them to the recording head 44.

The control circuit is connected to receive power from the power supply through the contacts A1 of the relay RLA. The arrangement is such that for power to be delivered to the control circuit and the amplifier the coin controlled relay 20 must first be actuated and this is achieved in the manner described above.

Actuation of the contacts A1 energises both the motor MT to rotate the turntable, and the cam index motor MC to rotate the carriage actuating cam C. The rotation of the cam C causes the carriage to be lowered to bring its follower 56 into contact with the lead screw 55 now being driven from the turntable motor via the belt drive 58.

When the cam C has rotated through 120° it opens the switch M6 to switch off the cam index motor MT, the recording head then being in contact with a disc clamped on the turntable by the clamping head 31 on the clamping arm 32.

After a few "run-in" grooves have been formed in the disc surface, the carriage, in its travel under the action of the lead screw, actuates the switch M2 to cause signals transmitted by the amplifier 6A to be transmitted to the recording head which thus forms a corresponding sound groove is the disc surface.

After expiration of the recording period the carriage movement closes the switch M14 to energise the overdrive motor MO which rotates the lead-screw at an increased speed to cause over-running of the free wheel device 64 and the formation of a "run out" groove in the inner part of the record disc.

At the end of the formation of the run-out groove the carriage operates switch M8 to actuate the latch relay B and shift its three contacts B1, B2 and B3. Shifting of the contact B1, through which the power to the turntable motor MT is transmitted, de-energises the turntable motor and simultaneously cuts the supply connection to switches M5 and M6 through one of which the cam index motor MC has hitherto been driven. However, contact B2 having been shifted, the cam index motor MC is now energised through switch M7, which since the initial movement of the cam C to the lower carriage, has been held closed by cam C*b*. Thus movement of the cam index motor continues and through the agency of the cam C the carriage is lifted into its raised position, the cams N1, N1*a* and N1*b* then being returned to their original starting position. The cam index motor MC is stopped by switch M7 falling open when the follower actuating the contact arm of the switch reaches the notch in the cam surface of the cam C*b*.

When the carriage reaches its lifted position it closes the switch M9 by pressing against the actuating arm of the switch. The contact of the switch M9, as also the contacts of switches M10 and M12, has been connected to supply through the contact B1. The closing of switch M9 energises the clamp arm actuating solenoid 91 to lift the clamp arm and release the record disc. When fully "up" the clamp arm closes a switch M10 secured to a fixed support adjacent the arm to energise the detent actuating solenoid 86 via the closed switch M11, which is held closed (as illustrated) during the record making operation by one of the pins 89 on the notched plate 82. The closing of switch M10 also energises a contact C2 of the latch relay C, which contact is held closed when the relay C is unenergised.

The detent actuating solenoid 86, when energised, actuates the link 87 carrying the detent 84 engaging one of the three notches 83 in the notched plate to bring the detent out of engagement and actuate switch M12 which connects the supply through a switch M13 to the delivery plate motor MD, which then drives the double rubber-shod rollers 76, 77 which engage the edge of the delivery plate between them. Rotation of the delivery plate 72 "sweeps" the disc upon which a recording has been made into the delivery chute 75, leading to the delivery slot 71 from which the record can be removed by the person in the booth.

Rotation of the delivery plate also brings a new, blank disc from the magazine into position on the turntable and at the same time turns the notched plate 82 to release the switch M11 and so connect the supply received by the switch (via the closed switch M10 and contacts A1 and B1) to energise the latch relay C3 and so actuate its three contacts. The changeover of switch M11 also de-energises the detent actuating solenoid 86 to release the detent 84 (which cannot fall back into the notch as the notch has now moved on) to ride on the curved periphery on the notched disc 82. To ensure that the detent actuating solenoid cannot be re-operated (by the next pin on the plate closing the switch M11) to hold the detent out of the notch reached when the plate 82 has turned through 120° a contact C2 of the relay C breaks when the relay C is energised to cut off the connection between the switch M11 and the detent actuating solenoid 84.

Thus the detent falls into the next notch and the associated link 87 is arranged to trip the switch M13 (located below the platform adjacent the link 87) which changes the supply connection to the delivery plate motor MD in such a manner as to tend to reverse the direction of the motor and so provide a heavy braking torque upon the rotating delivery plate. Immediately after the tripping of the switch M13 when the detent falls into the slot, the switch M12 (originally operated when the detent was moved out of its slot) is released to cut off the supply to the delivery plate motor MD and the plate is thus stopped "dead," the recording by then, having been delivered into the chute 75 and a blank disc brought into position upon the turntable.

Switch M12 moreover, on disconnecting the supply from the delivery plate motor MD connects the supply instead to the unlatching coil of the relay RLA via a contact C1 (which was closed) on actuation of the latch relay C.

The relay RLA thus returns to its un-energised position to allow contacts A1 to open and so cut off the supply to the amplifier and preamplifier, to the tape traversing motor and to the switches to stop rotation of the turntable motor and de-energise the clamp arm solenoid 91 so that the new disc is clamped to the turntable, all in readiness for a new record making cycle when the carriage has been returned to its original position, the latch relays B and C released and the selected push button 15 has been released.

The release of the latch relays B and C occurs in the return of relay A to the un-energised position since the unlatching coils of the relays B and C are connected in parallel through a common contact C3 closed on energisation of the relay C and a contact A2 which is held open on energisation of relay A. The connection to the unlatching coil of relay C is taken through a contact B3 held open on energisation of the relay B.

When relay A is unlatched, therefore, contact A2 returns to the closed position to connect the supply through contact C3 to unlatch the relay B and so cause the contact B3 to shut. The shutting of contact B3 then connects the supply to the unlatching coil of relay C which in turn opens a contact C3 and so disconnects the supply from the unlatching coils ready for the next cycle of operation.

Recycling is prevented if for any reason no disc has been positioned upon the turntable or the disc on the turntable is askew by reason of either the switch M4 or the switch M3 being held open by the clamp arm, the two switches being connected in series in the power supply line to the green light and the solenoid actuating the slot closure bar. If no record is on the turntable the clamp arm takes up a position lower than that when a disc is properly in place to allow switch M4 to fall open, while if the disc is askew, the clamp arm is held up in a "high" position to hold switch M3 open.

The carriage is returned to its starting position during rotation of the disc delivery plate by the horizontal carriage return lever which is engaged at one end by one of the three pins on the notched plate to be rotated about a vertical pivot 107 and engage with its other end the post 99 extending downwards through the slot 102 in the platform from the thrust rod 101. Thus when the lever is rotated the carriage is pushed back to its starting position.

When the carriage is thus restored to its starting position it operates a micro-switch 114 controlling the unlatching coil 20A so that the switch 19 operates to re-close the contacts 21 and open the contacts 20. The selected push button 13 is thus released and the apparatus rendered in-operative but ready for operation on the insertion of another coin.

Temperature control apparatus 113 (FIGURE 3) may be provided in the compartment in which the apparatus is housed to maintain the temperature therein at or near the optimum temperature required for proper formation of the sound groove in the material of which the record disc is composed.

What I claim as my invention and desire to secure by Letters Patent is:

1. Sound record producing apparatus comprising means for supporting in a readily removable and replaceable manner and traversing, a magnetic tape having spaced laterally thereof a multiplicity of individual sound tracks constituting individual recordings, each individual recording starting at aproximately the same point in the length of the tape, electronic amplifying apparatus, pickup means for transmitting impulses from said sound tracks to said amplifying apparatus, selector means whereby any one of said sound tracks can be selected to be operative to transmit impulses through said pickup means to said amplifying apparatus, a rotary support for a record disc on which a mechanical sound record can be made, a stylus type recording head connected to the amplifying apparatus to receive impulses therefrom, recording head control means operable to move the said recording head into and out of recording engagement with a record disc disposed upon said turntable to make a sound record thereon in the form of a spiral groove, storage means for a plurality of record discs, transfer means for transferring the discs one by one from the storage means to the turntable and for removing each disc from the turntable prior to the transfer of the next disc on to the turntable and for delivering the removed disc to a receiving point, and operating mechanism arranged to be brought into operation by an initiating device on insertion of a coin and serving upon such initiation to render the amplifying apparatus effective to cause traversing of the pickup means by the selected sound track to cause operation of the turntable and the recording head control means to cause the stylus to record on a record disc on the turntable the signals derived through the amplifying apparatus from the selected sound track, and subsequently to remove the disc from the turntable and deliver it to the receiving point.

2. Sound record producing apparatus as claimed in claim 1 wherein the said pickup means comprises a multiple pickup head having a number of pickup units corresponding in number and relative disposition to the sound tracks on the magnetic tape and disposed so that said sound tracks respectively traverse said pickup units while said selection means comprise selector switch apparatus by which any selected one of said pickup units can be connected to said amplifying apparatus.

3. Sound record producing apparatus as claimed in claim 1 wherein the selector switch apparatus comprises a number of individually operable off-on switch devices associated respectively with the pickup means and wherein each switch device includes an automatic lock operative to lock it in its "on" position when moved into that position, and electrically operated lock release mechanism which, when energized, prevents operation of the lock mechanism to retain the switch device in its "on" position, and wherein said coin-operated means includes a further electric switch which controls the lock release mechanism to render it operative to retain any selected switch device, when operated, in its "on" position.

4. Sound record producing apparatus as claimed in claim 1 including a loud-speaker device arranged to be operated by impulses from said amplifying apparatus simultaneously with operation of the stylus type recording head whereby simultaneous sound reproduction and production of a disc type record from any selected sound track is effected.

References Cited by the Examiner

UNITED STATES PATENTS

| | | | |
|---|---|---|---|
| 2,679,917 | 6/1954 | Andres | 194—15 XR |
| 3,143,199 | 8/1964 | Gerber | 274—3 XR |
| 3,148,757 | 9/1964 | Larsson | 274—10 XR |
| 3,169,624 | 2/1965 | Baker et al. | 194—15 |

NORTON ANSHER, *Primary Examiner.*

C. B. PRICE, *Assistant Examiner.*